(12) United States Patent
Dixon et al.

(10) Patent No.: US 7,540,468 B2
(45) Date of Patent: Jun. 2, 2009

(54) ANGLED POPPET VALVE MANUAL OVERRIDE MECHANISM

(75) Inventors: Matthew J. Dixon, Mesa, AZ (US); Craig T. Dorste, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 357 days.

(21) Appl. No.: 11/412,362

(22) Filed: Apr. 26, 2006

(65) Prior Publication Data

US 2007/0252097 A1 Nov. 1, 2007

(51) Int. Cl.
*F16K 35/00* (2006.01)
(52) U.S. Cl. .................. 251/102; 251/101; 251/63.6
(58) Field of Classification Search .............. 251/60, 251/62, 63.5, 63.6, 89, 95, 101, 102, 111
See application file for complete search history.

(56) References Cited

U.S. PATENT DOCUMENTS

| | | | |
|---|---|---|---|
| 1,799,143 A * | 4/1931 | Bailey .................. 137/556.3 |
| 3,790,126 A | 2/1974 | Ostand et al. |
| 3,979,103 A | 9/1976 | Branson et al. |
| 4,057,217 A * | 11/1977 | MacDonald ............ 251/308 |
| 4,173,986 A | 11/1979 | Martin |
| 4,355,658 A | 10/1982 | Snyder |
| 4,801,051 A * | 1/1989 | Lewis et al. ............ 222/309 |
| 4,848,724 A | 7/1989 | Pettinaroli |
| 5,067,510 A | 11/1991 | Breaux et al. |
| 5,188,335 A | 2/1993 | Pettinaroli |
| 5,819,791 A | 10/1998 | Chronister et al. |
| 5,904,302 A | 5/1999 | Brown |
| 6,718,932 B1 | 4/2004 | Cecur et al. |
| 6,837,266 B2 | 1/2005 | Fredrickson et al. |

* cited by examiner

*Primary Examiner*—John K Fristoe, Jr.
(74) *Attorney, Agent, or Firm*—Ingrassia Fisher & Lorenz, P.C.

(57) ABSTRACT

An apparatus is provided for a valve assembly comprising a valve body, a valve element, a shaft, an engagement stop, an actuator housing, a manual lockout, and a lock. The valve body includes an inlet port, an outlet port, and a flow passage extending therebetween. The valve element is disposed within the valve body flow passage, and is movable between a closed position and a full-open position. The shaft is coupled to the valve element and extends through the valve body. The engagement stop is coupled to, and extends radially from, the shaft. The actuator housing at least partially surrounds the shaft. The manual lockout is configured, upon receipt of a torque, to selectively engage and disengage the engagement stop. The lock is coupled to the actuator housing, and is movable between a lock position and an unlock position.

20 Claims, 1 Drawing Sheet

ANGLED POPPET VALVE MANUAL OVERRIDE MECHANISM

TECHNICAL FIELD

The present invention generally relates to an assembly for a valve, and more particularly relates to an assembly for manually opening a valve and locking the valve in an open position.

BACKGROUND

Valves are used to control gases or other fluids in various types of apparatus and vehicles, such as aircraft. For example, valves may be used to control the supply of bleed air to aircraft anti-icing systems, among various other uses in aircraft and other types of apparatus and vehicles. In the aircraft anti-icing system example, valves are typically configured to open automatically via a mechanism such as a spring, and to close automatically through a pneumatic mechanism. However, in some instances, it may be desirable to include an alternative mechanism, such as a manual mechanism, for opening a valve in the highly unlikely event that a valve spring, or some other part, does not function properly. It is also desirable for such a manual mechanism to be able to lock the valve in a full-open position, and for pilots of aircraft, or operators of other vehicles or apparatus, to be able to visually verify that the valve is locked in the full-open position. Moreover, because valves used in aircraft can be subjected to potentially severe temperatures and conditions, it is desirable that such valves are designed to withstand such temperatures and conditions.

Accordingly, there is a need for a valve assembly, capable of withstanding potentially severe temperatures and conditions, for opening a valve, locking the valve in an open position, and providing visual confirmation of the same to the operators of the vehicle or apparatus.

BRIEF SUMMARY OF THE INVENTION

An apparatus is provided for a valve assembly. In one embodiment, and by way of example only, the valve assembly comprises a valve body, a valve element, a shaft, an engagement stop, an actuator housing, a manual lockout, and a lock. The valve body includes an inlet port, an outlet port, and a flow passage extending between the inlet and outlet ports. The valve element is disposed within the valve body flow passage, and is movable between a closed position and a full-open position. The shaft is coupled to the valve element and extends through the valve body. The engagement stop is coupled to, and extends radially from, the shaft. The actuator housing is coupled to the valve body and at least partially surrounds the shaft. The manual lockout is movably coupled to the actuator housing, and at least partially surrounds the shaft. The manual lockout is configured, upon receipt of a torque, to selectively engage and disengage the engagement stop. The lock is coupled to the actuator housing. The lock is movable between a lock position, in which the lock at least inhibits movement of the manual lockout, and an unlock position, in which the lock allows movement of the manual lockout.

In another embodiment, and by way of example only, the valve body assembly comprises a valve body, a valve element, a shaft, an engagement stop, an actuator housing, a manual lockout, and a jam nut. The valve body includes an inlet port, an outlet port, and a flow passage extending between the inlet and outlet ports. The valve element is disposed within the valve body flow passage, and is movable between a closed position and a full-open position. The shaft is coupled to the valve element and extends through the valve body. The engagement stop is coupled to, and extends radially from, the shaft. The engagement stop comprises a washer and a lock nut disposed against the washer and configured to hold the washer into place. The actuator housing is coupled to the valve body and at least partially surrounds the shaft. The manual lockout is movably coupled to the actuator housing, and at least partially surrounds the shaft. The manual lockout is configured, upon receipt of a torque, to selectively engage and disengage the engagement stop. The jam nut is coupled to the actuator housing. The jam nut is movable between a lock position, in which the jam nut at least inhibits movement of the manual lockout, and an unlock position, in which the jam nut allows movement of the manual lockout.

In yet another embodiment, and by way of example only, the valve body assembly comprises a valve body, a valve element, a shaft, an engagement stop, an actuator housing, a manual lockout, a jam nut, and threads. The valve body includes an inlet port, an outlet port, and a flow passage extending between the inlet and outlet ports. The valve element is disposed within the valve body flow passage, and is movable between a closed position and a full-open position. The shaft is coupled to the valve element and extends through the valve body. The engagement stop is coupled to, and extends radially from, the shaft. The engagement stop comprises a washer and a lock nut disposed against the washer and configured to hold the washer into place. The actuator housing is coupled to the valve body and at least partially surrounds the shaft. The manual lockout is movably coupled to the actuator housing, and at least partially surrounds the shaft. The manual lockout is configured, upon receipt of a torque, to selectively engage and disengage the engagement stop. The jam nut is coupled to the actuator housing. The jam nut is movable between a lock position, in which the jam nut at least inhibits movement of the manual lockout, and an unlock position, in which the jam nut allows movement of the manual lockout. The threads are disposed on the manual lockout, and are configured to be coupled with the jam nut to secure the manual lockout into place.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
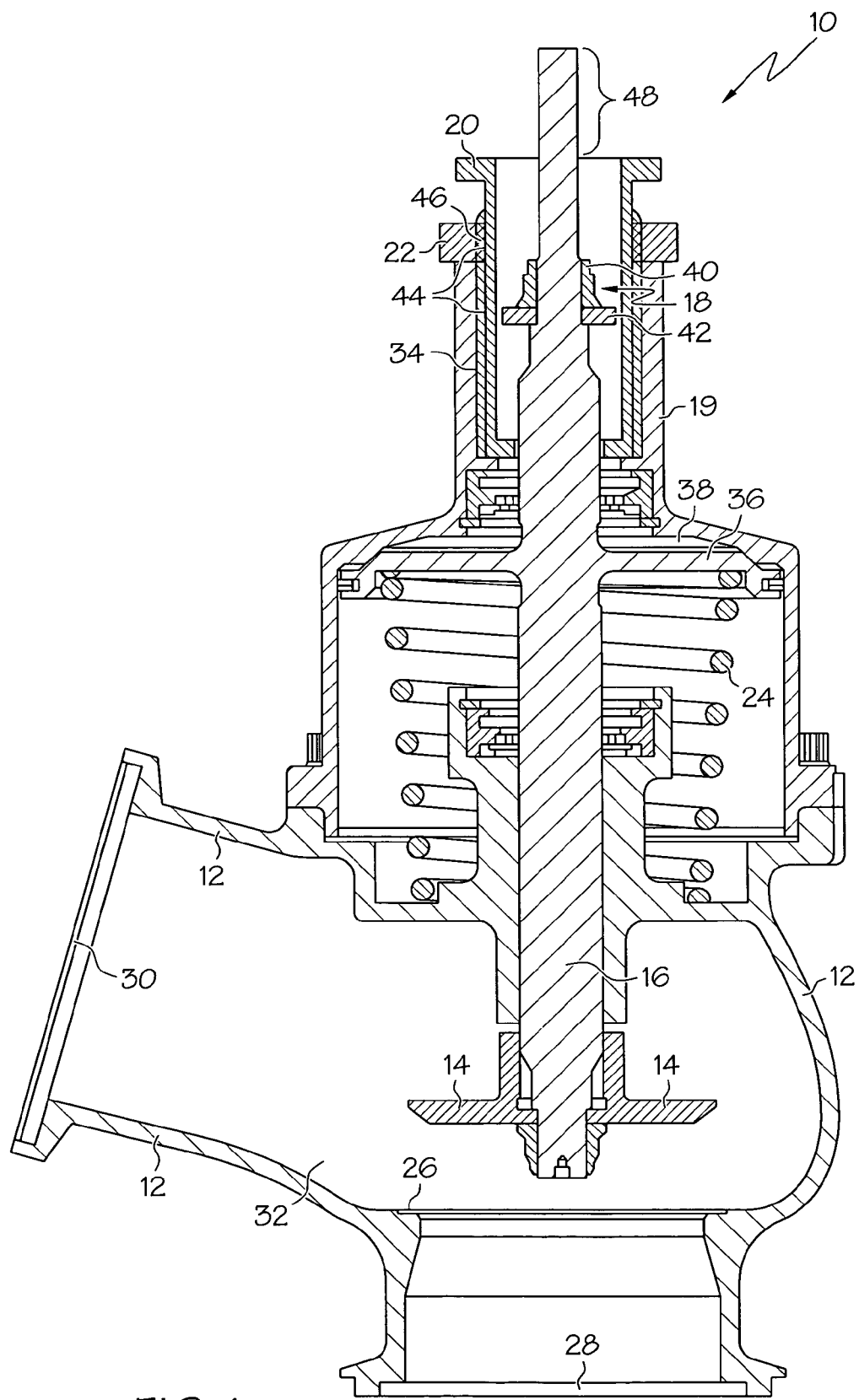
FIG. 1 depicts a simplified cross section view of a valve assembly for opening a valve and locking the valve in a full-open position.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 depicts a simplified cross section view of an exemplary embodiment of a valve assembly 10. The valve assembly 10 includes a valve body 12, a valve element 14, a shaft 16, an engagement stop 18, an actuator housing 19, a manual lockout 20, and a lock 22. The valve assembly 10 also preferably includes a spring 24 and a valve seat 26.

As depicted in FIG. 1, the valve body 12 has at least an inlet port 28, an outlet port 30, and a flow passage 32 extending between the inlet 28 and outlet 30 ports. By way of example only, in a particular embodiment for a valve utilized in an aircraft anti-icing system, the inlet port 28, the outlet port 30, and the flow passage 32 allow for the controlled flow of bleed air. For example, in the aircraft anti-icing system embodiment, the valve assembly 10 can influence or control the flow of bleed air from a turbine engine compressor (not shown) to an environmental control system or other anti-icing apparatus (not shown), when bleed air is needed or desired. It will be appreciated by one of ordinary skill in the art that any of numerous different gases or other fluids can flow through a particular valve assembly 10, from any one of numerous different sources, and for any one of numerous different purposes. Regardless of the particular gases or other fluids capable of flowing therethrough, such flow is controlled through movement of the valve element 14, as described below.

The valve element 14 is disposed within the valve body flow passage 32 and, as mentioned above, controls the flow of fluids, such as bleed air in the aircraft anti-icing system example. The valve element 14 is movable between a closed position, in which fluid is at least substantially restricted (and preferably fully restricted) from flowing through the flow passage 32, and a full-open position, in which fluid can freely flow through the flow passage 32. For ease of reference, FIG. 1 depicts the valve element 14 in a single position, namely the full-open position. Conversely, when the valve element 14 is in the closed position, the valve element 14 seats against the valve seat 26, thereby at least substantially blocking the flow of fluid through the flow passage 32.

The shaft 16 is coupled to the valve element 14, and extends through the valve body 12 and the actuator housing 19. The shaft 16 is used to move the valve element 14 between the closed and full-open position. During the normal operation of the valve assembly 10, the valve element 14 is biased toward the full-open position via the spring 24. In particular, the spring 24 at one end rests against the valve body 12, and at the other end rests against a piston 36 that extends radially from the shaft 16. The valve 10 is pneumatically moved into the closed position by supplying pressurized air to a cavity 38, via a non-illustrated air source. The pressurized air exerts a downward force on the piston 36. When the downward force exerted on the piston 36 exceeds the upward bias force supplied by the spring 24, the piston 36 moves downward, thereby moving the shaft 16 and the valve element 14 concomitantly therewith, until the valve element 14 seats against the valve seat 26 in the closed position. As mentioned above, it will be appreciated that the valve element 14 may be used to control the flow of any one of numerous different types of fluids, including bleed air and/or any one of numerous other types of gases or other fluids, and/or combinations thereof.

The engagement stop 18 is coupled to, and extends radially from, the shaft 16. In a preferred embodiment, the engagement stop 18 includes at least a washer 40. The washer 40 is preferably made of a material, such as a material from the A-286 family of alloys, capable of withstanding high temperatures. The washer 40 is also preferably made with an enhanced thickness for withstanding large amounts of pressure. In the preferred embodiment of FIG. 1, the engagement stop 18 also includes a lock nut 42 disposed against the washer 40, and adapted to hold the washer 40 in place. However, it will be appreciated that the engagement stop 18 can take any one of numerous different configurations.

The actuator housing 19 is coupled to the valve body 12, and at least partially surrounds the shaft 16. In a preferred embodiment, the actuator housing 19 and the valve body 12 can be formed separately, and the actuator housing 19 can be bolted, otherwise attached to, or otherwise disposed proximate the valve body 12. Alternatively, that actuator housing 19 and the valve body 12 can be formed as a unitary piece. It will be appreciated that the actuator housing 19 can take any one of numerous different configurations. Regardless of the particular configuration, the actuator housing 19 preferably includes a plurality of actuator housing threads 34, as will be discussed further in connection with the manual lockout 20 below.

The manual lockout 20 is coupled to the actuator housing 19, preferably through a plurality of manual lockout threads 44, disposed on the manual lockout 20, that mate with the valve body threads 34. The manual lockout 20 is configured, upon receipt of a torque, to selectively engage and disengage the engagement stop 18. For example, in the preferred embodiment of FIG. 1, the manual lockout 20, upon receipt of a torque, moves upward, out of the actuator housing 19, and contacts the washer 40. Upon contacting the washer 40, the manual lockout 20, upon further application of torque, exerts a force on the shaft 16. This in turn results in upward movement of the shaft 16, and the valve element 14 along with the shaft 16, until the valve element 14 is in the full-open position. As will be described below, the valve element 14 can then be locked into the full-open position with the lock 22. It will be appreciated that the manual lockout 20 can be coupled to, and engage and disengage, the engagement stop 18 using any one of numerous different mechanisms corresponding with the various possible configurations of the engagement stop 18. Regardless of the various coupling, engaging and disengaging mechanisms, the manual lockout 20 allows for the valve element 14 to be moved into the full-open position when desired, for example in the unlikely event of a failure of the spring 24, which is typically used to move the valve element 14 into the full-open position.

The lock 22 is coupled to the actuator housing 19, and is movable between a lock position, in which the lock 22 at least inhibits movement of the manual lockout 20, and an unlock position, in which the lock 22 allows movement of the manual lockout 20. In the preferred embodiment depicted in FIG. 1, the lock 22 is implemented using a jam nut. The jam nut 22 is threaded onto the manual lockout 20 via a plurality of jam nut threads 46, disposed on the jam nut 22, that mate with the manual lockout threads 44. The jam nut 22 can be moved from the lock position to the unlock position by loosening the jam nut 22, and likewise can be moved from the unlock position to the lock position by tightening the jam nut 22.

In a preferred embodiment, the jam nut 22 remains in the tightened, lock position during ordinary operation of the valve assembly 10. In the rare case of a malfunction, such as with the spring 24, the jam nut 22 can be moved into the unlock position through loosening of the jam nut 22, thereby allowing movement of the manual lockout 20. Torque can then be applied to the manual lockout 20 to engage the engagement stop 18, and thereby move the shaft 16, and concomitantly the valve element 14, into the full-open position. Once the valve element 14 is in the full-open position, the jam nut 22 can then be tightened into the lock position, thereby restricting movement of the manual lockout 20 and the shaft 16, and in turn locking the valve element 14 in the full-open position.

Accordingly, the valve assembly 10 allows for the valve element 14 to be manually opened and locked into the full-open position, when needed. In a preferred embodiment involving the specific types of washers 40 mentioned above, the valve assembly 10 is able to withstand severe temperature, pressure, and other operating conditions, such as conditions potentially existing in an engine nacelle of an aircraft. Moreover, in this preferred embodiment, the valve assembly 10 has an additional advantage of providing the operator with visual confirmation when the valve element 14 is locked in the full-open position. Specifically, when the valve element 14 is locked in the full-open position in the embodiment of FIG. 1, there is a portion 48 of the shaft 16 that extends beyond the actuator housing 19 and the manual lockout 20, providing visual confirmation that the valve element 14 is locked in the full-open position.

It will be appreciated that, in other embodiments, the procedures for using the valve assembly 10 may differ. For example, it will be appreciated that if some other type of lock 22, other than a jam nut, is used, there may be different procedures involved in moving the lock 22 between the lock and unlock positions. It will similarly be appreciated that other procedures may also be involved for using the valve assembly 10 if the engagement stop 18, and/or some other features of the valve assembly 10, take a different configuration than that depicted in FIG. 1. It will also be appreciated that the valve assembly 10 may also contain other components, such as a poppet guide and seals for sealing any unwanted openings created after installing the engagement stop 18 and the manual lockout 20, among various other possible components.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A valve assembly, comprising:
   a valve body having an inlet port, an outlet port, and a flow passage extending between the inlet and outlet ports;
   a valve element disposed within the valve body flow passage and movable between a closed position and a full-open position;
   a shaft coupled to the valve element and extending through the valve body;
   an engagement stop coupled to, and extending radially from, the shaft;
   an actuator housing coupled to the valve body and at least partially surrounding the shaft;
   a manual lockout movably coupled to the actuator housing and at least partially surrounding the shaft, the manual lockout configured, upon receipt of a torque, to selectively engage and disengage the engagement stop, the manual lockout locking the valve element in the full-open position when engaging the engagement stop; and
   a lock coupled to the actuator housing and movable between a lock position, in which the lock at least inhibits movement of the manual lockout, and an unlock position, in which the lock allows movement of the manual lockout.

2. The valve assembly of claim 1, further comprising:
   threads disposed on the manual lockout, the threads configured to be coupled with the lock to secure the manual lockout into place.

3. The valve assembly of claim 1, wherein the manual lockout piece is cylindrical in shape.

4. The valve assembly of claim 1, wherein the lock comprises a jam nut.

5. The valve assembly of claim 1, wherein the actuator housing and the valve body are formed as a unitary piece.

6. The valve assembly of claim 1, wherein the engagement stop comprises at least a washer.

7. The valve assembly of claim 6, wherein the engagement stop further comprises a lock nut disposed against the washer, the lock nut configured to hold the washer into place.

8. The valve assembly of claim 6, wherein the washer is made of a material capable of withstanding high temperatures and large amounts of pressure.

9. The assembly of claim 6, wherein the washer is made of a material from the A-286 family of alloys.

10. The assembly of claim 6, wherein the manual lockout overrides operation of the valve assembly by locking the valve element in the full-open position.

11. A valve assembly, comprising:
    a valve body having an inlet port, an outlet port, and a flow passage extending between the inlet and outlet ports;
    a valve element disposed within the valve body flow passage and movable between a closed position and a full-open position;
    a shaft coupled to the valve element and extending through the valve body;
    an engagement stop coupled to, and extending radially from, the shaft, the engagement stop comprising:
    a washer; and
    a lock nut disposed against the washer, the lock nut configured to hold the washer into place;
    an actuator housing coupled to the valve body and at least partially surrounding the shaft;
    a manual lockout movably coupled to the actuator housing and at least partially surrounding the shaft, the manual lockout configured, upon receipt of a torque, to selectively engage and disengage the engagement stop, the manual lockout locking the valve element in the full-open position when engaging the engagement stop; and
    a jam nut coupled to the actuator housing and movable between a lock position, in which the jam nut at least inhibits movement of the manual lockout, and an unlock position, in which the jam nut allows movement of the manual lockout.

12. The valve assembly of claim 11, wherein the actuator housing and the valve body are formed as a unitary piece.

13. The valve assembly of claim 11, further comprising:
    threads disposed on the manual lockout, the threads configured to be coupled with the jam nut to secure the manual lockout into place.

14. The valve assembly of claim 11, wherein the manual lockout piece is cylindrical in shape.

15. The valve assembly of claim 11, wherein the washer is made of a material capable of withstanding high temperatures and large amounts of pressure.

16. The assembly of claim 11, wherein the washer is made of a material from the A-286 family of alloys.

17. The assembly of claim 11, wherein the manual lockout overrides operation of the valve assembly by locking the valve element in the full-open position.

18. A valve assembly, comprising:
    a valve body having an inlet port, an outlet port, and a flow passage extending between the inlet and outlet ports;
    a valve element disposed within the valve body flow passage and movable between a closed position and a full-open position;

a shaft coupled to the valve element and extending through the valve body;

an engagement stop coupled to, and extending radially from, the shaft, the engagement stop comprising:
  a washer; and
  a lock nut disposed against the washer, the lock nut configured to hold the washer into place;

an actuator housing coupled to the valve body and at least partially surrounding the shaft;

a manual lockout movably coupled to the actuator housing and at least partially surrounding the shaft, the manual lockout configured, upon receipt of a torque, to selectively engage and disengage the engagement stop, the manual lockout locking the valve element in the full-open position when engaging the engagement stop;

a jam nut coupled to the actuator housing and movable between a lock position, in which the jam nut at least inhibits movement of the manual lockout, and an unlock position, in which the jam nut allows movement of the manual lockout; and threads disposed on the manual lockout, the threads configured to be coupled with the jam nut to secure the manual lockout into place.

19. The valve assembly of claim 18, wherein the manual lockout piece is cylindrical in shape.

20. The valve assembly of claim 18, wherein the manual lockout overrides operation of the valve assembly by locking the valve element in the full-open position.

* * * * *